(12) United States Patent
Lin

(10) Patent No.: US 12,089,284 B2
(45) Date of Patent: Sep. 10, 2024

(54) METHOD FOR NETWORK CONTROL AND RELATED PRODUCTS

(71) Applicant: GUANGDONG OPPO MOBILE TELECOMMUNICATIONS CORP., LTD., Guangdong (CN)

(72) Inventor: Jinquan Lin, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 290 days.

(21) Appl. No.: 17/665,306

(22) Filed: Feb. 4, 2022

(65) Prior Publication Data

US 2022/0159777 A1 May 19, 2022

Related U.S. Application Data

(63) Continuation of application No. PCT/CN2020/106843, filed on Aug. 4, 2020.

(30) Foreign Application Priority Data

Aug. 30, 2019 (CN) .......................... 201910815573.2

(51) Int. Cl.
*H04W 4/00* (2018.01)
*H04W 76/10* (2018.01)
(Continued)

(52) U.S. Cl.
CPC ........... *H04W 76/30* (2018.02); *H04W 76/10* (2018.02); *H04W 84/12* (2013.01); *H04W 92/10* (2013.01)

(58) Field of Classification Search
CPC ..... H04W 76/30; H04W 76/10; H04W 84/12; H04W 92/10; H04W 36/06;
(Continued)

(56) References Cited

U.S. PATENT DOCUMENTS 10,492,173 B2 * 11/2019 Jeong ................ H04W 72/0453
2004/0259589 A1 12/2004 Bahl et al.
(Continued)

FOREIGN PATENT DOCUMENTS

CN   105592491 A  * 5/2016 ........... H04W 24/04
CN   105657795      6/2016
(Continued)

OTHER PUBLICATIONS

CNIPA, First Office Action for CN Application No. 201910815573.2, Feb. 20, 2021.
(Continued)

*Primary Examiner* — Thai D Hoang
(74) *Attorney, Agent, or Firm* — Hodgson Russ LLP

(57) ABSTRACT

A method for network control and related products are provided, which are applied to electronic device. The electronic device includes a first network module and a second network module. The first network module is configured to be connected with a first WiFi network, a second WiFi network, or the both. A target frequency band at which the first network module interferes with the second network module is determined on condition that the first network module is connected with both the first WiFi network and the second WiFi network, when the second network module is enabled. A target WiFi network interface corresponding to the target frequency band is released, where the target WiFi network interface is at least one of following: a first WiFi network interface for a first WiFi network or a second WiFi network interface for a second WiFi network. Network connection is performed through the second network module.

20 Claims, 8 Drawing Sheets

(51) Int. Cl.
*H04W 76/30* (2018.01)
*H04W 84/12* (2009.01)
*H04W 92/10* (2009.01)

(58) Field of Classification Search
CPC ... H04W 60/005; H04W 16/14; H04W 76/36; H04W 88/02; H04W 40/16; H04W 76/15; H04W 24/04
See application file for complete search history.

(56) References Cited

U.S. PATENT DOCUMENTS

| | | | | |
|---|---|---|---|---|
| 2015/0034719 A1* | 2/2015 | Wei | .................. | H04W 72/0453 |
| | | | | 235/383 |
| 2017/0094640 A1* | 3/2017 | Jeong | ................ | H04W 72/0453 |
| 2017/0295512 A1* | 10/2017 | Rangaswamy | ... | H04W 28/0205 |
| 2021/0377803 A1* | 12/2021 | Huang | .................. | H04W 76/15 |
| 2022/0124480 A1* | 4/2022 | Huang | .................... | H04W 8/12 |
| 2023/0262810 A1* | 8/2023 | Liu | ....................... | H04W 76/15 |
| | | | | 370/329 |

FOREIGN PATENT DOCUMENTS

| | | | | |
|---|---|---|---|---|
| CN | 107231159 | | 10/2017 | |
| CN | 108377157 | | 8/2018 | |
| CN | 108430094 | | 8/2018 | |
| CN | 109041240 | | 12/2018 | |
| CN | 109547058 | | 3/2019 | |
| CN | 109743712 | | 5/2019 | |
| CN | 112333690 A | * | 2/2021 | ........ H04W 72/1263 |
| EP | 1489788 | | 12/2004 | |
| EP | 3247150 A1 | | 11/2017 | |

OTHER PUBLICATIONS

CNIPA, Second Office Action for CN Application No. 201910815573.2, Jul. 1, 2021.
CNIPA, Rejection for CN Application No. 201910815573.2, Oct. 8, 2021.
WIPO, International Search Report for PCT/CN2020/106843, Oct. 28, 2020.
CNIPA, Reexamination Decision for CN Application No. 201910815573.2, May 31, 2022.
EPO, Extended European Search Report for EP Application No. 20859315.2, Sep. 9, 2022.

* cited by examiner

METHOD FOR NETWORK CONTROL AND RELATED PRODUCTS

CROSS-REFERENCE TO RELATED APPLICATIONS

This application is a continuation of International Application No. PCT/CN2020/106843, filed on Aug. 4, 2020, which claims priority to Chinese Patent Application No. 201910815573.2, filed on Aug. 30, 2019, the entire disclosures of which are incorporated herein by reference.

TECHNICAL FIELD

The disclosure relates to the technology field of communications, in particular to a method for network control and related products.

BACKGROUND

With popularization and application of electronic devices (such as mobile phones, tablet computers, etc.), the electronic devices can support more and more applications and their functions are becoming more and more powerful. The electronic devices are developing towards diversification and personalization, and become indispensable electronic products in users' lives.

Currently, the electronic device can connect two wireless fidelity (WiFi) networks simultaneously. When the electronic device connects two WiFi networks simultaneously, the electronic device operates in a dual WiFi operating mode. If there are other network modules in the electronic devices which are performing network data transmission, the two WiFi networks may interfere with the other network modules. Therefore, it is urgent to solve a problem of avoiding interference with the other network modules when the electronic device operates in the dual WiFi operating mode.

SUMMARY

In a first aspect, implementations of this disclosure provides a method for network control applied to an electronic device. The electronic device includes a first network module and a second network module. The first network module is configured to be connected with a first WiFi network, a second WiFi network, or both, the first network module works at a first frequency band when the first network module is connected with the first WiFi network, and the first network module works at a second frequency band when the first network module is connected with the second WiFi network. The method includes following.

When the second network module is enabled, a target frequency band at which the first network module interferes with the second network module is determined on condition that the first network module is connected with both the first WiFi network and the second WiFi network. A target WiFi network interface corresponding to the target frequency band is released, where the target WiFi network interface is a first WiFi network interface for the first WiFi network, a second WiFi network interface for the second WiFi network, or both. Network connection is performed through the second network module.

In a second aspect, implementations of the present disclosure provide an electronic device. The electronic device includes a processor, a memory, a communication interface, and one or more programs. The one or more programs are stored in the memory and configured to be executed by the processor, and the programs include instructions for part or all of operations in the method described in the first aspect of implementations of the present disclosure.

In a third aspect, implementations of the present disclosure provide a non-transitory computer-readable storage medium. The non-transitory computer-readable storage medium is configured to store a computer program. The computer program causes a computer to perform instructions for part or all of operations described in the first aspect of implementations of the present disclosure.

BRIEF DESCRIPTION OF THE DRAWINGS

To describe technical solutions in implementations of the present disclosure or in the related art more clearly, the following briefly introduces accompanying drawings required for illustrating the implementations. Apparently, the accompanying drawings in the following description illustrate some implementations of the present disclosure. Those of ordinary skill in the art may also obtain other drawings based on these accompanying drawings without creative efforts.

DETAILED DESCRIPTION

In order for those skilled in the art to better understand technical solutions of implementations, technical solutions of the implementations will be described clearly and completely with reference to accompanying drawings in the implementations. Apparently, implementations hereinafter described are merely some implementations, rather than all implementations, of present disclosure. All other implementations obtained by those of ordinary skill in the art based on the implementations herein without creative efforts shall fall within the protection scope of the present disclosure.

The terms "first", "second", and the like used in the specification, the claims, and the accompany drawings of the present disclosure are used to distinguish different objects rather than describe a particular order. In addition, the terms "include", "comprise", and "have" as well as variations thereof are intended to cover non-exclusive inclusion. For example, a process, method, system, product, or device including a series of steps or units is not limited to the listed steps or units. Instead, it can optionally include other steps or units that are not listed; alternatively, other steps or units inherent to the process, method, product, or device can also be included.

The term "implementation" referred to herein means that a particular feature, structure, or character described in conjunction with the implementation may be contained in at least one implementation of the present disclosure. The phrase appearing in various places in the specification does not necessarily refer to the same implementation, nor does it refer to an independent or alternative implementation that is mutually exclusive with other implementations. It is explicitly and implicitly understood by those skilled in the art that an implementation described herein may be combined with other implementations.

An electronic device referred to herein may include various handheld devices, in-vehicle devices, wearable devices, computing devices that have wireless communication functions or other processing devices connected with a wireless modem, as well as various forms of user equipment (UE), mobile stations (MS), terminal devices, and the like. For ease of description, the above-mentioned devices are collectively referred to as an electronic device.

Implementations of this disclosure are explained in detail below.

Figure 1:
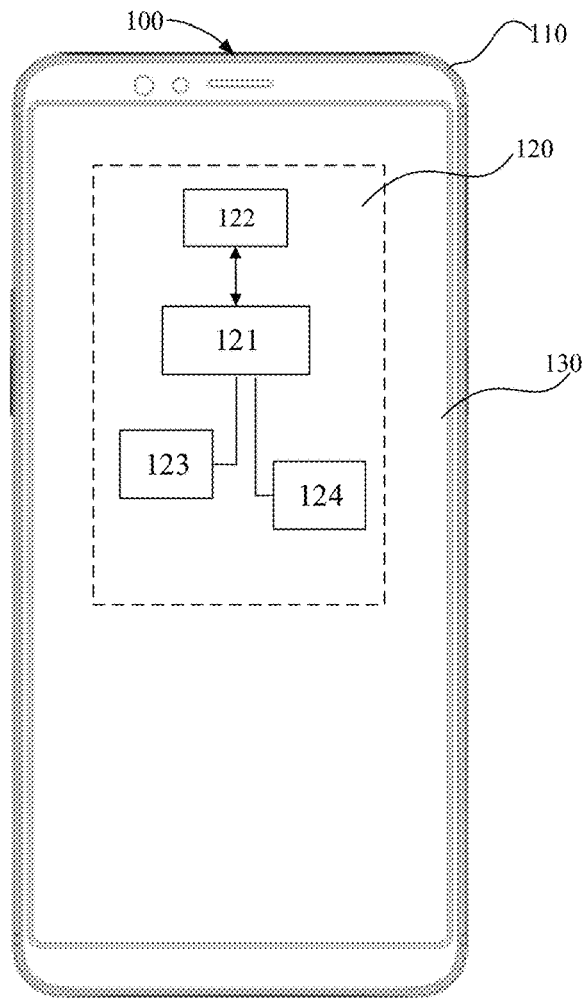
FIG. 1 is a schematic structural diagram of an electronic device provided in implementations of the present disclosure.

Referring to FIG. 1, which is a schematic structural diagram of an electronic device 100 provided in implementations of this disclosure, the electronic device 100 includes a housing 110 and a circuit board 120 disposed in the housing 110. The circuit board 120 is provided with a processor 121, a first network module 123, a second network module 124, and a memory 122. The processor 121 is connected with the first network module 123, the second network module 124, and the memory 122 respectively.

Figure 2:
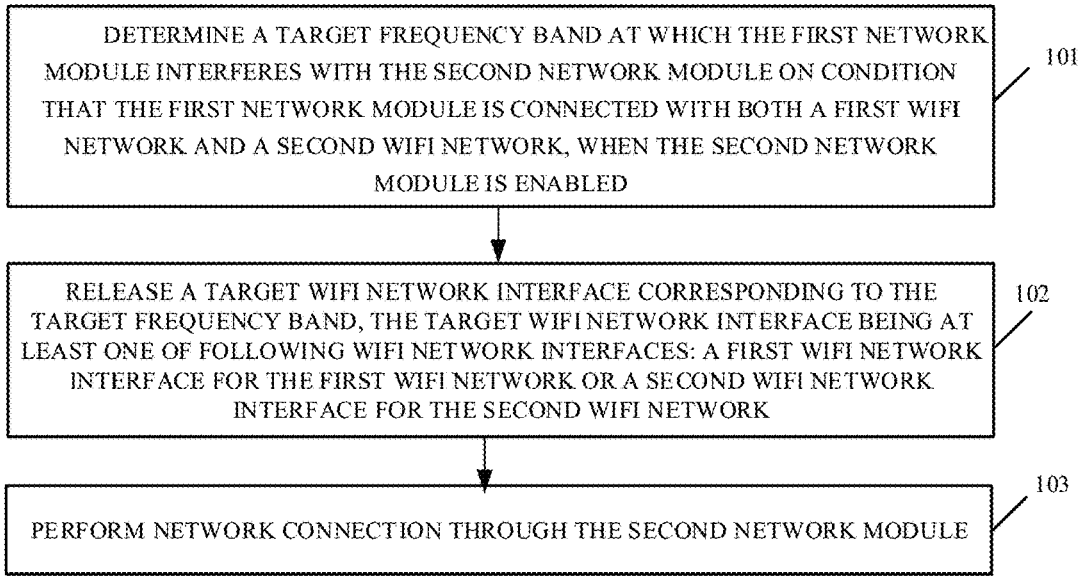
FIG. 2 is a flow diagram of a method for network control provided in implementations of the present disclosure.

Please refer to FIG. 2, which is a flow diagram of a method for network control provided in implementations of this disclosure, the method for network control described in this implementation is applied to the electronic device as illustrated in FIG. 1. The electronic device includes a first network module and a second network module. The first network module is configured to be connected with at least one the first WiFi network and the second WiFi network, the first network module works at a first frequency band when the first network module is connected with the first WiFi network, and the first network module works at a second frequency band when the first network module is connected with the second WiFi network. The method includes the following.

At 201, when the second network module is enabled, a target frequency band at which interferes with the second network module is determined on condition that the first network module is connected with both the first WiFi network and the second WiFi network.

The first network module works at different frequency bands when the first network module is connected with the first WiFi network and the second WiFi network. For example, the first network module connected with the first WiFi network can work at a 5 G operating frequency band which corresponds to an operating frequency range of 5.15 G-5.85 Ghz. The first network module connected with the second WiFi network can work at a 2.4 G operating frequency band which corresponds to a working frequency range of 2.4 G-2.4835 Ghz.

In this implementation of the disclosure, the first WiFi network and the second WiFi network in the electronic device can work individually or simultaneously. Specifically, when the electronic device is only connected with one WiFi network, a WiFi function with a higher operating frequency among the first WiFi network and the second WiFi network can be preferentially enabled for network connection. For example, for a 2.4 G WiFi network and a 5 G WiFi network, the 5 G WiFi network can be preferentially enabled to work individually, so that a faster network rate of the individually working WiFi network can be guaranteed. When the first WiFi network and the second WiFi network in the electronic device work simultaneously, a network connection rate of the electronic device can be higher. When the first WiFi network and the second WiFi network in the electronic device work simultaneously, it can be determined that the electronic device is in a dual WiFi mode.

The second network module refers to other network modules except those for the two WiFi networks. For example, the second network module can be a Bluetooth network module or a mobile data network module.

In the implementation of this disclosure, the electronic device can also operate two WiFi networks and a second network module except those for the WiFi networks simultaneously. However, in a specific implementation, there may be a situation where there is signal interference between at least one of the two WiFi networks and the second network module. Therefore, it can be determined whether the first WiFi network and the second WiFi network are both in an operating state when a function of the second network module is enabled. If both the first WiFi network and the second WiFi network are in the operating state, that is, the electronic device is in the dual WiFi operating mode, a target frequency band at which the second network module is interfered can be determined from the first frequency band and the second frequency band.

Optionally, in operations at 201 above, determining the target frequency band at which the first network module interferes with the second network module may include the following.

The first WiFi network interface for the first WiFi network in the first network module is determined to interfere with the second network module and the first frequency band is determined as the target frequency band, when the first frequency band overlaps with an operating frequency band of the second network module. The second WiFi network interface for the second WiFi network in the first network module is determined to interfere with the second network module and the second frequency band is determined as the target frequency band, when the second frequency band overlaps with the operating frequency band of the second network module.

In this implementation of the disclosure, it can be determined which of the first WiFi network and the second WiFi network interferes with the second network module. Specifically, it can be determined whether the first frequency band overlaps with the operating frequency band of the second network module. If the first frequency band overlaps with the operating frequency band of the second network module, it indicates that there is interference between the first WiFi network and the second network module, that is, the target frequency band that interferes with the second network module is the first frequency band. If the first frequency band does not overlap with the operating frequency band of the second network module, it can be further determined whether the second frequency band overlaps with the operating frequency band of the second network module. If the second frequency band overlaps with the operating frequency band of the second network module, it indicates that there is interference between the second WiFi network and the second network module, that is, the target frequency band that interferes with the second network module is the second frequency band.

At 202, a target WiFi network interface corresponding to the target frequency band is released, the target WiFi network interface is at least one of following WiFi network interfaces: the first WiFi network interface for the first WiFi network or the second WiFi network interface for the second WiFi network.

In this implementation of the disclosure, in order to ensure the preferred operation of the second network module, the WiFi network that interferes with the second network module can be temporarily disabled. Specifically, if the target frequency band is the first frequency band, the first WiFi network interface for the first WiFi network can be released, so that a first WiFi network connection can be disconnected. If the target frequency band is the second frequency band, the second WiFi network interface for the second WiFi network can be released, so that a second WiFi network connection can be disconnected, thereby ensuring that there is no interference generated by the WiFi networks when the second network module is in operation.

It can be seen that after the first WiFi network interface for the first WiFi network is released, or the second WiFi network interface for the second WiFi network is released, the dual WiFi operating mode of the electronic device is disabled.

At 203, network connection is performed through the second network module.

In this implementation of the application, after the first WiFi network interface for the first WiFi network is released, or the second WiFi network interface for the second WiFi network is released, the network connection can be performed through the second network module to enable network data transmission through the second network module, thus avoiding the interference with the second network module when the electronic device is in the dual WiFi operating mode.

For example, when the second network module is the Bluetooth network module, the first network module is connected with the 5 G WiFi network and the 2.4 G WiFi network, if the dual WiFi operating mode of the electronic device and the Bluetooth network module exist at the same time, the second WiFi network of 2.4 G will interfere with the Bluetooth network module. Therefore, it can be detected whether the electronic device is in the dual WiFi operating mode when the Bluetooth network module is enabled. If the electronic device is in the dual WiFi operating mode, the function of the second WiFi network of 2.4 G is disabled, that is, the second WiFi network interface for the second WiFi network is released, thereby ensuring that working of the Bluetooth network module is not interfered.

Optionally, in the implementation of this disclosure, the method further includes the following after the network connection is performed through the second network module at 203.

A data transmission task is performed through the second network module. The function of the second network module is disabled after the performing of the data transmission task through the second network module is finished, and creation of the target WiFi network interface corresponding to the target frequency band that is released is restored.

The data transmission task can include at least one of the following: audio data caching, voice calling, incoming call search, call dialing, etc., which is not limited herein.

In this implementation of the disclosure, the data transmission task performed by the second network module when the second network module performs the network connection takes priority over the network transmission task performed by the first network module through the WiFi network. Therefore, when the second network module is in operation, a dual WiFi function can be disabled, and only a WiFi network among the first WiFi network and the second WiFi network that does not interfere with the second network module can be reserved to operate. After the second network module finishes performing the data transmission task, for example, after an audio data caching task of the electronic device is finished, or after a call is finished, the second network module does not need to continue to operate, and at this time, the function of the second network module can be disabled, and creation of the target WiFi network interface corresponding to the target frequency band that is released is restored, so that the network connection through the disabled WiFi network can be restored. In this way, the dual WiFi operating mode of the electronic device can be automatically restored when the second network module is not needed.

Optionally, in the implementation of this disclosure, it may further include the following before the function of the second network module is enabled at 201.

It is determined whether the second network module is in an operating state when a simultaneous operation mode of the first WiFi network and the second WiFi network is activated. The first network module is controlled to simultaneously connect with both the first WiFi network and the second WiFi network when the second network module is not in the operating state.

In this implementation of the disclosure, when the dual WiFi operating mode of the electronic device is activated, it can be determined whether the second network module is in the operating state. If the second network module is already in the operating state at this time, the function of the WiFi network among the first WiFi network and the second WiFi network that interferes with the second network module can be temporarily prohibited, and in this way, interferences from the dual WiFi operating mode with the operating second network module can be avoided. If the second network module is not in the operating state at this time, the first network module can be controlled to simultaneously connect with both the first WiFi network and the second WiFi network.

Optionally, controlling the first network module to simultaneously connect with both the first WiFi network and the second WiFi network may include the following. The second WiFi network interface corresponding to the second WiFi network is created to make the first network module operate in the second frequency band through the second WiFi network interface, when the first WiFi network is connected. The first WiFi network interface corresponding to the first WiFi network is created to make the first network module operate in the first frequency band through the first WiFi network interface, and the second WiFi network interface corresponding to the second WiFi network is created to make the first network module operate in the second frequency band through the second WiFi network interface, when the first network module is not connected with both the first WiFi network and the second WiFi network.

In this implementation of the disclosure, specifically, controlling the first network module to simultaneously connect with both the first WiFi network and the second WiFi network involves two situations: firstly, if the first network module is already connected with the first WiFi network, at this time, the function of the second WiFi network needs to be enabled as well. Specifically, the second WiFi network interface corresponding to the second WiFi network can be created to make the first network module operate in the second frequency band through the second WiFi network interface, thus enabling the electronic device to enter the dual WiFi operating mode and improving the network rate of the electronic device. Secondly, if the first network module is not connected with both the first WiFi network and the second WiFi network, the first WiFi network interface corresponding to the first WiFi network and the second WiFi network interface corresponding to the second WiFi network can be created in parallel, to make the first network module operate in the first frequency band through the first WiFi network interface and the first network module operate in the second frequency band through the second WiFi network interface. As such, when the second network module is not in the operating state at this time, the first network module can be simultaneously connected with both the first WiFi network and the second WiFi network, so that the network connection rate of the electronic device can be improved, and user's experience of surfing the Internet can be improved.

Optionally, in the implementation of this disclosure, it further includes the following before it is determined whether the second network module is in an operating state when a simultaneous operation mode of the first WiFi network and the second WiFi network is activated.

It is determined that the simultaneous operation mode of the first WiFi network and the second WiFi network is activated, when the first network module is not connected with both the first WiFi network and the second WiFi network and a preset first control operation and a preset second control operation are received. The first control operation is configured to create the first WiFi network interface corresponding to the first WiFi network to make the first network module operate in the first frequency band through the first WiFi network interface. The second control operation is configured to create the second WiFi network interface corresponding to the second WiFi network to make the first network module operate in the second frequency band through the second WiFi network interface. Or, when the first network module is already connected with the first WiFi network and the preset second control operation is received, it is determined that the simultaneous operation mode is activated.

Figure 3:
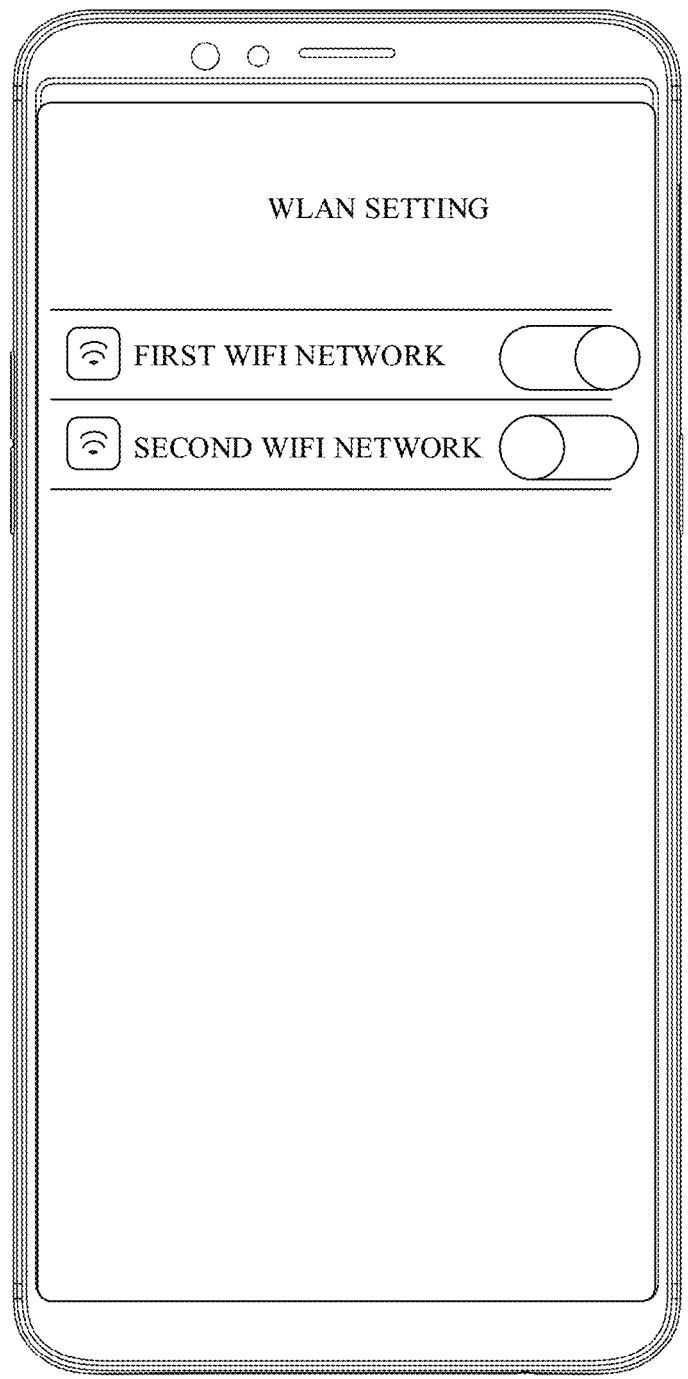
FIG. 3 is a schematic diagram of an interface for setting a WIFI network function provided in implementations of the present disclosure.

Before it is determined whether the second network module is in an operating state when a simultaneous operation mode of the first WiFi network and the second WiFi network is activated, the electronic device can receive the user's control operation, and the electronic device can start the dual WiFi operating mode according to the control operation. Specifically, as illustrated in FIG. 3, a setting interface of the WiFi network can displayed on the electronic device, with which the user can perform the first control operation. For example, the user can click a first virtual button to start the first WiFi network and a second virtual button to start the second WiFi network in the setting interface. The first WiFi can be determined to be started after the electronic device receives the first control operation, and the second WiFi can be determined to be started after the electronic device receives the second control operation. As such, it is determined that the simultaneous operation mode is activated, when the first network module is not connected with both the first WiFi network and the second WiFi network and the preset first control operation and the preset second control operation are received; it is determined that the simultaneous operation mode is activated, when the first network module is already connected with the first WiFi network and the preset second control operation is received.

Optionally, in the implementation of this disclosure, it further includes the following before it is determined whether the second network module is in an operating state when a simultaneous operation mode of the first WiFi network and the second WiFi network is activated.

A network connection rate of the first WiFi network is obtained when the first network module is already connected with the first WiFi network. It is determined the simultaneous operation mode of the first WiFi network and the second WiFi network is activated on condition that the network connection rate is lower than a preset network connection rate.

In this implementation of the disclosure, a network connection rate of the first WiFi network is obtained by the electronic device when the first network module is already connected with the first WiFi network. Specifically, the network connection rate of the first WiFi network can be detected at a preset frequency. If the network connection rate is lower than the preset network connection rate, which indicates that the electronic device may need to start the function of the second WiFi to speed up the network through the first WiFi, the electronic device can automatically start the function of the second WiFi at this time, and in this way, the electronic device can be automatically controlled to enter the dual WiFi operating mode when the network connection rate of the first WiFi network is low.

It can be seen that the method for network control described in the implementation of this disclosure is applied to the electronic device. The electronic device includes a first network module and a second network module, the first network module is configured to be connected with at least one the first WiFi network and the second WiFi network, the first network module works at a first frequency band when the first network module is connected with the first WiFi network, and the first network module works at a second frequency band when the first network module is connected with the second WiFi network. When the second network module is enabled, a target frequency band at which the first network module interferes with the second network module is determined on condition that the first network module is connected with both the first WiFi network and the second WiFi network. A target WiFi network interface corresponding to the target frequency band is released, where the target WiFi network interface is at least one of following WiFi network interfaces: a first WiFi network interface for the first WiFi network or a second WiFi network interface for the second WiFi network. Network connection is performed through the second network module. As such, the interference with the second network module can be avoided when the electronic device is in the dual WiFi operating mode.

Figure 4:
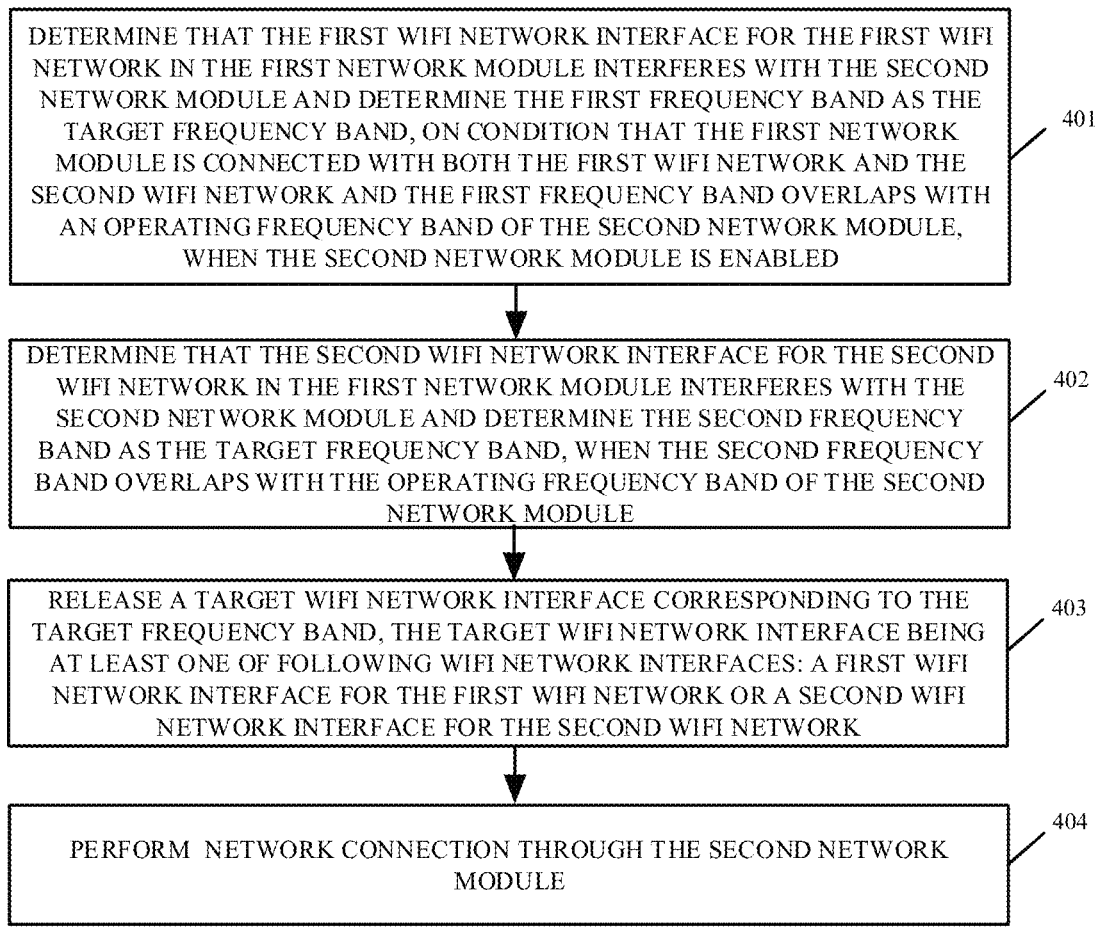
FIG. 4 is a schematic flow chart of a method for network control provided in other implementations of the present disclosure.

Please refer to FIG. 4, which is a flow diagram of a method for network control provided in implementations of the present disclosure, the method for network control described in this implementation is applied to an electronic device. The electronic device includes a first network module and a second network module, the first network module is configured to be connected with at least one the first WiFi network and the second WiFi network, the first network module works at a first frequency band when the first network module is connected with the first WiFi network, and the first network module works at a second frequency band when the first network module is connected with the second WiFi network, and the method includes the following.

At 401, when a function of the second network module is enabled and the first network module is connected with both the first WiFi network and the second WiFi network, the first WiFi network interface for the first WiFi network in the first network module is determined to interfere with the second network module and the first frequency band is determined as the target frequency band, if the first frequency band overlaps with an operating frequency band of the second network module.

At 402, the second WiFi network interface for the second WiFi network in the first network module is determined to interfere with the second network module and the second frequency band is determined as the target frequency band, if the second frequency band overlaps with the operating frequency band of the second network module.

At 403, a target WiFi network interface corresponding to the target frequency band is released, where the target WiFi network interface is at least one of following WiFi network interfaces: a first WiFi network interface for the first WiFi network or a second WiFi network interface for the second WiFi network.

At 404, network connection is performed through the second network module.

Implementations of the operations at 401 to 404 can be referred to corresponding descriptions of operations at 201 to 203, which will not be repeated here.

It can be seen that the method for network control described in the implementation of this disclosure is applied to an electronic device. The electronic device includes a first network module and a second network module, the first network module is configured to be connected with at least one the first WiFi network and the second WiFi network, the first network module works at a first frequency band when the first network module is connected with the first WiFi network, and the first network module works at a second frequency band when the first network module is connected with the second WiFi network. When the second network module is enabled and the first network module is connected with both the first WiFi network and the second WiFi network, the first WiFi network interface for the first WiFi network in the first network module is determined to interfere with the second network module and the first frequency band is determined as the target frequency band if the first frequency band overlaps with an operating frequency band of the second network module; the second WiFi network interface for the second WiFi network in the first network module is determined to interfere with the second network module and the second frequency band is determined as the target frequency band if the second frequency band overlaps with an operating frequency band of the second network module. The target WiFi network interface corresponding to the target frequency band is released, where the target WiFi network interface is at least one of following WiFi network interfaces: a first WiFi network interface for the first WiFi network or a second WiFi network interface for the second WiFi network. Network connection through the second WiFi network module. As such, the interference with the second network module can be avoided when the electronic device is in the dual WiFi operating mode.

Figure 5:
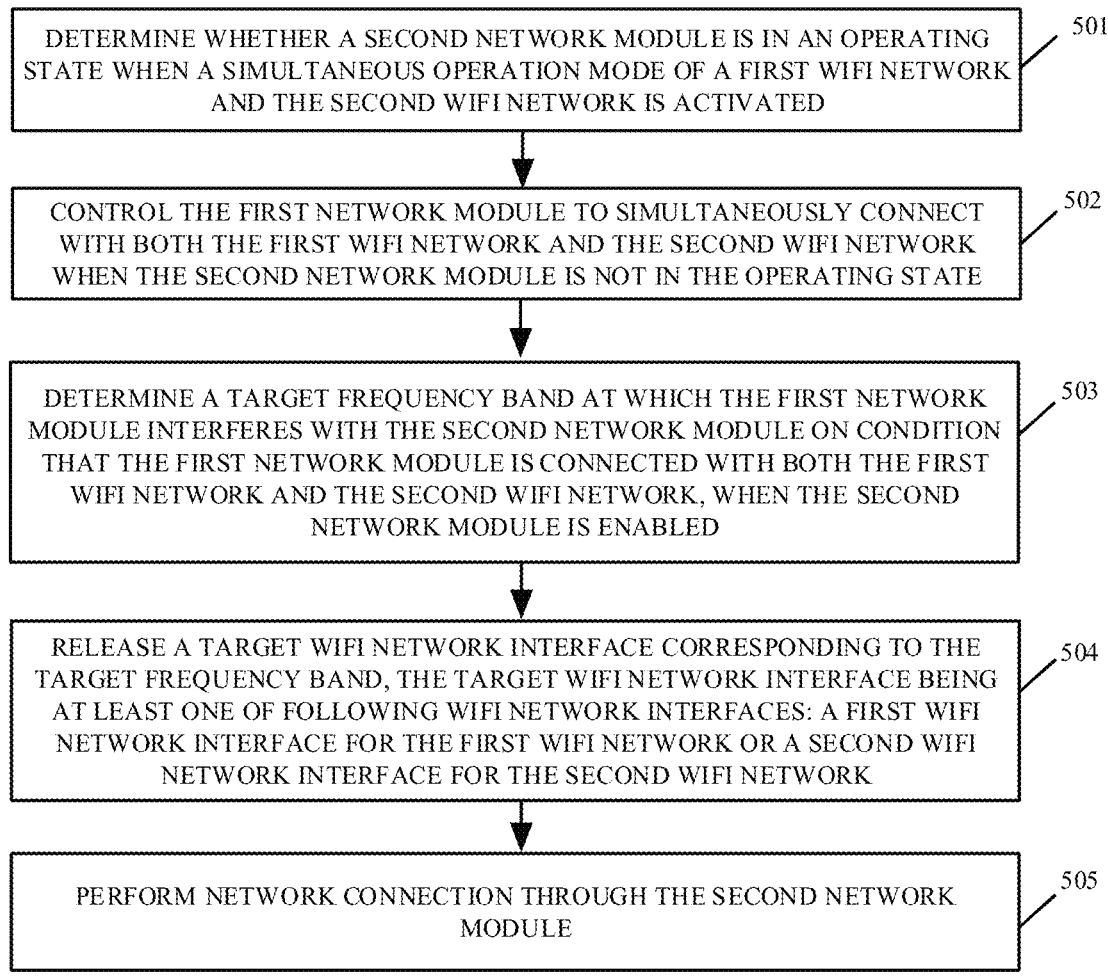
FIG. 5 is a schematic flow chart of a method for network control provided in other implementations of the present disclosure.

Consistent with the above and referring to FIG. 5, which is a flow diagram of a method for network control provided in implementations of this disclosure, the method for network control described in this implementation is applied to the electronic device. The electronic device includes a first network module and a second network module, the first network module is configured to be connected with at least one the first WiFi network and the second WiFi network, the first network module works at a first frequency band when the first network module is connected with the first WiFi network, and the first network module works at a second frequency band when the first network module is connected with the second WiFi network. The method includes the following.

At 501, it is determined whether the second network module is in an operating state when a simultaneous operation mode of the first WiFi network and the second WiFi network is activated.

At 502, the first network module is controlled to simultaneously connect with both the first WiFi network and the second WiFi network when the second network module is not in the operating state.

Figure 6:
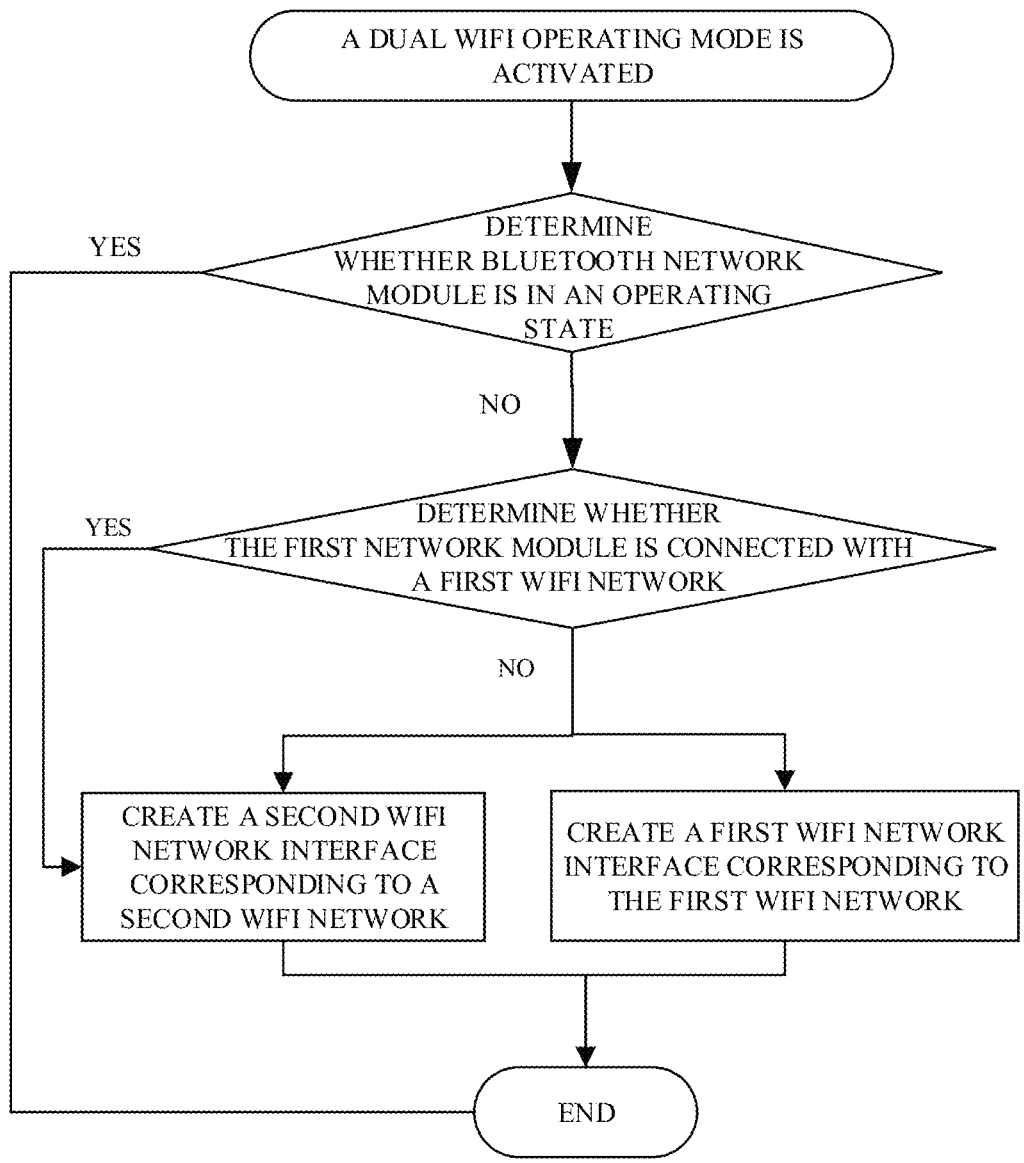
FIG. 6 is a schematic flow chart of a method for network control provided in other implementations of the present disclosure.

For example, referring to FIG. 6, as illustrated in FIG. 6, when the second network module is the Bluetooth network module, the first WiFi network is the 5 G WiFi network and the second WiFi network is the 2.4 G WiFi network, firstly, it can be determined whether the Bluetooth network module is in the operating state when the dual WiFi operating mode of the electronic device is activated. If the Bluetooth network module is not in the operating state, it can be determined whether the first WiFi has been connected. If the first WiFi has been connected, the second WiFi network interface corresponding to the second WiFi can be created. If the first WiFi has not been connected, the first WiFi network interface corresponding to the first WiFi can be created and the second WiFi network interface corresponding to the second WiFi can be created. In this way, interferences from the dual WiFi operating mode with the operating second network module can be avoided, and if the second network module is not in the operating state at this time, the first network module can be controlled to simultaneously connect with both the first WiFi network and the second WiFi network, so that a WiFi network connection rate can be increased, and user's experience of surfing the Internet through the WiFi can be improved.

At 503, a target frequency band at which the first network module interferes with the second network module is determined on condition that the first network module is connected with both the first WiFi network and the second WiFi network, when the second network module is enabled.

At 504, a target WiFi network interface corresponding to the target frequency band is released, where the target WiFi network interface is at least one of following WiFi network interfaces: a first WiFi network interface for the first WiFi network or a second WiFi network interface for the second WiFi network.

At 505, network connection is performed through the second network module.

Implementation of operations at 501 to 505 can be referred to corresponding descriptions of operations at 201 to 203, which will not be repeatedly described here.

Figure 7:
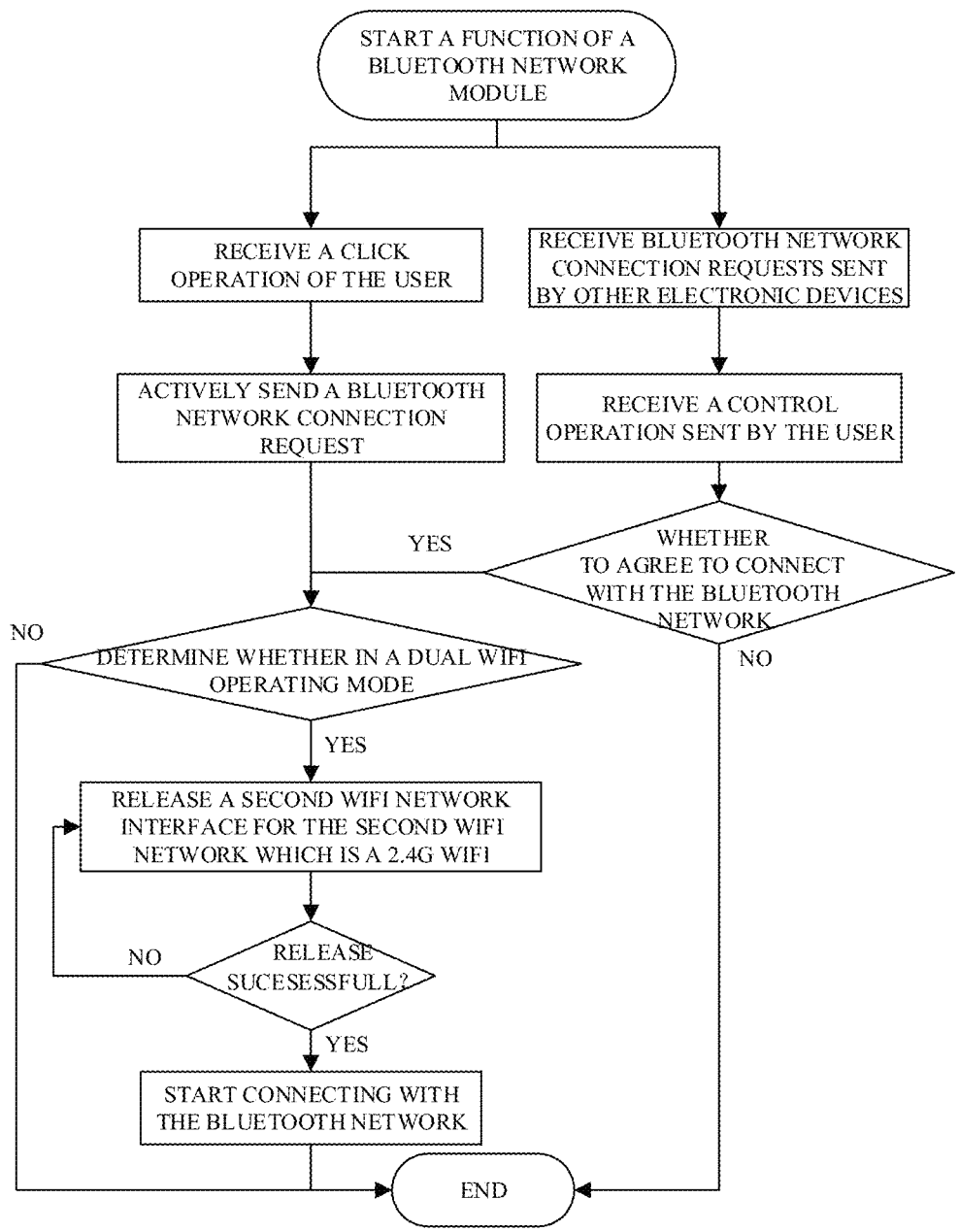
FIG. 7 is a schematic flow chart of a method for network control provided in other implementations of the present disclosure.

For example, referring to FIG. 7, as illustrated in FIG. 7, when the second network module is the Bluetooth network module, the first WiFi network is the 5 G WiFi network and the second WiFi network is the 2.4 G WiFi network, firstly, the electronic device can start a function of the Bluetooth network module, and the electronic device can actively connect with Bluetooth network modules of other electronic devices. Specifically, the user can click on a Bluetooth network interface of the electronic device, and the electronic device can actively send a Bluetooth network connection request after receiving a click operation of the user. Then, it is determined whether the electronic device is in the dual WiFi operating mode, and if the electronic device is in the dual WiFi operating mode, the second WiFi network interface for the second WiFi which is a 2.4 G WiFi can be released. Finally, connecting with the Bluetooth network can be started. Alternatively, the electronic device can receive Bluetooth network connection requests sent by other electronic devices, and then, the electronic device can receive a control operation sent by the user which indicates whether to agree to connect with the Bluetooth network. If the electronic device receives a control operation which indicates agreeing to connect to the Bluetooth network, whether the electronic device is in the dual WiFi operating mode is determined, and if the electronic device is in the dual WiFi operating mode, the second WiFi network interface for the second WiFi which is a 2.4 G WiFi can be released. Finally, connecting with the Bluetooth network can be started.

It can be seen that the method for network control described in the implementation of this disclosure is applied to the electronic device. The electronic device includes a first network module and a second network module, the first network module is configured to be connected with at least one the first WiFi network and the second WiFi network, the first network module works at a first frequency band when the first network module is connected with the first WiFi network, and the first network module works at a second frequency band when the first network module is connected with the second WiFi network. When a simultaneous operation mode of the first WiFi network and the second WiFi network is activated, it is determined whether the second network module is in an operating state. When the second network module is not in the operating state, the first network module is controlled to simultaneously connect with both the first WiFi network and the second WiFi network. When the second network module is enabled, the target frequency band at which the first network module interferes with the second network module is determined on condition that both the first WiFi network and the second WiFi network are in the operating state. The first WiFi network interface corresponding to the first frequency band is released on condition that the target frequency band is the first frequency band and the second WiFi network interface corresponding to the second frequency band is released on condition that the target frequency band is the second frequency band. The network connection is performed through the second network module. As such, the interference with the second network module can be avoided when the electronic device is in the dual WiFi operating mode.

The following describes devices for implementing the above-mentioned network control method, which is specifically as follows.

Figure 8:
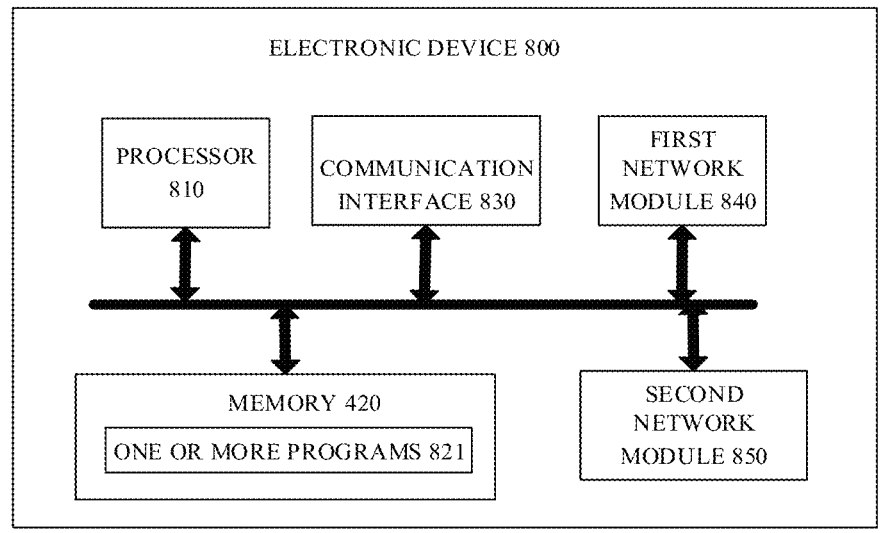
FIG. 8 is a schematic structural diagram of an electronic device provided in other implementations of the present disclosure.

As is consistent with the above, reference is made to FIG. 8, which is a structural schematic diagram of an electronic device provided in implementations of the disclosure. As illustrated in FIG. 8, the electronic device includes a first network module 840, a second network module 450, a processor 810, and a communication interface 830, a memory 820, and one or more programs 821. The one or more programs 821 are stored in the memory 820 and configured to be executed by the processor. The first network module is configured to be connected with at least one the first WiFi network and the second WiFi network, the first network module works at a first frequency band when the first network module is connected with the first WiFi network, and the first network module works at a second frequency band when the first network module is connected with the second WiFi network. The programs 821 includes instructions for executing following operations.

A target frequency band at which the first network module interferes with the second network module is determined on condition that the first network module is connected with both the first WiFi network and the second WiFi network, when the second network module is enabled. A target WiFi network interface corresponding to the target frequency band is released, where the target WiFi network interface is at least one of following WiFi network interfaces: a first WiFi network interface for the first WiFi network or a second WiFi network interface for the second WiFi network. Network connection is performed through the second network module.

As an implementation, in terms of determining the target frequency band at which the first network module interferes with the second network module, the programs 821 includes instructions for executing following operations.

The first WiFi network interface for the first WiFi network in the first network module is determined to interfere with the second network module and the first frequency band is determined as the target frequency band, when the first frequency band overlaps with an operating frequency band of the second network module. The second WiFi network interface for the second WiFi network in the first network module is determined to interfere with the second network module and the second frequency band is determined as the target frequency band, when the second frequency band overlaps with the operating frequency band of the second network module.

As an implementation, the programs 821 further includes instructions for executing following operations after the network connection is performed through the second network module.

A data transmission task is performed through the second network module. A function of the second network module is disabled after the performing of the data transmission task through the second network module is finished, and creation of the target WiFi network interface corresponding to the target frequency band that is released is restored.

As an implementation, the programs 821 further includes instructions for executing following operations.

It is determined whether the second network module is in an operating state when a simultaneous operation mode of the first WiFi network and the second WiFi network is activated. The first network module is controlled to simultaneously connect with both the first WiFi network and the second WiFi network when the second network module is not in the operating state.

As an implementation, in terms of controlling the first network module to simultaneously connect with the first WiFi network and the second WiFi network, the programs 821 includes instructions for executing following operations.

The second WiFi network interface corresponding to the second WiFi is created to make the first network module operate in the second frequency band through the second WiFi network interface, when the first network module is connected with the first WiFi network. The first WiFi network interface corresponding to the first WiFi is created to make the first network module operate in the first frequency band through the first WiFi network interface and the second WiFi network interface corresponding to the second WiFi is created to make the first network module operate in the second frequency band through the second WiFi network interface, when the first network module is not connected with both the first WiFi network and the second WiFi network.

As an implementation, the programs 821 further includes instructions for executing following operations.

The simultaneous operation mode is determined to be activated, when the first network module is not connected with both the first WiFi network and the second WiFi network and a preset first control operation and a preset second control operation are received. The first control operation is configured to create the first WiFi network interface corresponding to the first WiFi network to make the first network module operate in the first frequency band through the first WiFi network interface. The second control operation is configured to create the second WiFi network interface corresponding to the second WiFi network to make the first network module operate in the second frequency band through the second WiFi network interface. Or, the simultaneous operation mode is determined to be activated, when the first network module is already connected with the first WiFi network and the preset second control operation is received.

As an implementation, the programs 821 further includes instructions for executing following operations.

A network connection rate of the first WiFi network is obtained when the first network module is already connected with the first WiFi network. The simultaneous operation mode of the first WiFi network and the second WiFi network is determined to be activated on condition that the network connection rate is lower than a preset network connection rate.

Figure 9:
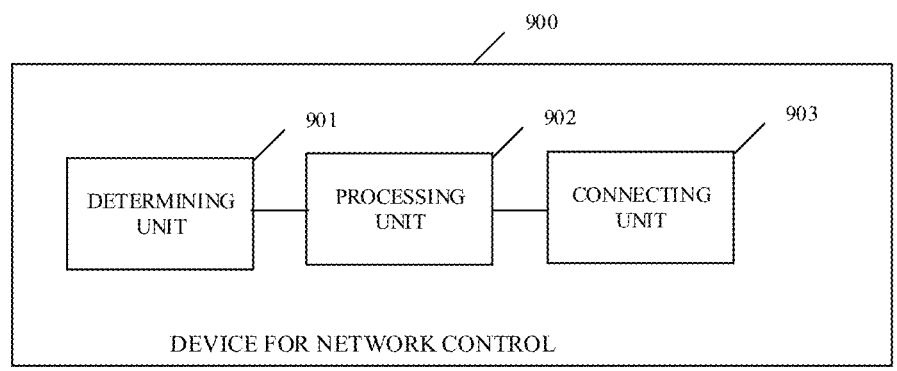
FIG. 9 is a schematic structural diagram of a device for network control provided in implementations of the present disclosure.

Reference is made to FIG. 9, which is a schematic structural diagram of a device for network control provided in implementations of the present disclosure. The device for network control is applied to an electronic device which includes a first network module and a second network module. The first network module is configured to be connected with at least one the first WiFi network and the second WiFi network, the first network module works at a first frequency band when the first network module is connected with the first WiFi network, and the first network module works at a second frequency band when the first network module is connected with the second WiFi network. The device for network control includes a determining unit 901, a processing unit 902, and a connecting unit 903.

The determining unit 901 is configured to determine a target frequency band at which the first network module interferes with the second network module on condition that the first network module is connected with both the first WiFi network and the second WiFi network, when the second network module is enabled.

The processing unit 902 is configured to release a target WiFi network interface corresponding to the target frequency band, the target WiFi network interface being at least one of following WiFi network interfaces: a first WiFi network interface for the first WiFi network or a second WiFi network interface for the second WiFi network.

The connecting unit 903 is configured to perform network connection through the second network module.

As an implementation, in terms of determining the target frequency band at which the first network module interferes with the second network module, the determining unit 901 is specifically configured to: determine that the first WiFi network interface for the first WiFi network in the first network module interferes with the second network module and determining the first frequency band as the target frequency band, when the first frequency band overlaps with an operating frequency band of the second network module; determine that the second WiFi network interface for the second WiFi network in the first network module interferes with the second network module and determining the second frequency band as the target frequency band, when the second frequency band overlaps with the operating frequency band of the second network module.

As an implementation, the determining unit is further configured to detect whether the second frequency band overlaps with the operating frequency band of the second network module on condition that the first frequency band does not overlap the operating frequency band of the second network module.

As an implementation, the processing unit 902 is further configured to: perform a data transmission task through the second network module after the network connection is performed through the second network module; disable a function of the second network module after the performing of the data transmission task through the second network module is finished, and restore creation of the target WiFi network interface corresponding to the target frequency band that is released.

As an implementation, the determining unit 901 is further configured to determine whether the second network module is in an operating state when a simultaneous operation mode of the first WiFi network and the second WiFi network is activated after the network connection is performed through the second network module. The processing unit 902 is further configured to control the first network module to simultaneously connect with both the first WiFi network and the second WiFi network when the second network module is not in the operating state.

As an implementation, in terms of controlling the first network module to simultaneously connect with the first WiFi network and the second WiFi network, the processing unit is specifically configured to: create the second WiFi network interface corresponding to the second WiFi network to make the first network module operate in the second frequency band through the second WiFi network interface, when the first network module is connected with the first WiFi network; create the first WiFi network interface corresponding to the first WiFi network to make the first network module operate in the first frequency band through the first WiFi network interface and creating the second WiFi network interface corresponding to the second WiFi network to make the first network module operate in the second frequency band through the second WiFi network interface, when the first network module is not connected with both the first WiFi network and the second WiFi network.

As an implementation, the determining unit 901 is further configured to: determine that the simultaneous operation mode is activated, when the first network module is not connected with both the first WiFi network and the second WiFi network and a preset first control operation and a preset second control operation are received; where the first control operation is configured to create the first WiFi network interface corresponding to the first WiFi network to make the first network module operate in the first frequency band through the first WiFi network interface; where the second control operation is configured to create the second WiFi network interface corresponding to the second WiFi network to make the first network module operate in the second frequency band through the second WiFi network interface; or determine the simultaneous operation mode is activated, when the first network module is already connected with the first WiFi network and the preset second control operation is received.

Figure 10:
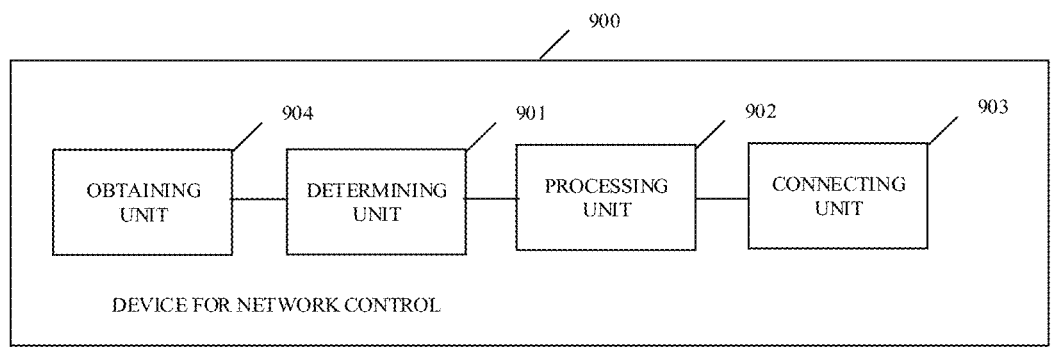
FIG. 10 illustrates a modified structure of the device for network control illustrated in FIG. 9 provided in implementations of the present disclosure.

As an implementation, reference is made to FIG. 10, which illustrates a modified structure of the device for network control illustrated in FIG. 9 provided in implementations of the present disclosure, and compared with the device for network control illustrated in 5A, the device for network control illustrated in 5B further includes an obtaining unit 904. The obtaining unit 904 is configured to obtain a network connection rate of the first WiFi network when the first network module is already connected with the first WiFi network. The determining unit 901 is further configured to determine the simultaneous operation mode is activated on condition that the network connection rate is lower than a preset network connection rate.

It can be seen that the device for network control described in the implementation of this disclosure is applied to the electronic device. The electronic device includes a first network module and a second network module, the first network module is configured to be connected with at least one the first WiFi network and the second WiFi network, the first network module works at a first frequency band when the first network module is connected with the first WiFi network, and the first network module works at a second frequency band when the first network module is connected with the second WiFi network. When the second network module is enabled, a target frequency band at which the first network module interferes with the second network module is determined on condition that the first network module is connected with both the first WiFi network and the second WiFi network. A target WiFi network interface corresponding to the target frequency band is released, where the target WiFi network interface is at least one of following WiFi network interfaces: a first WiFi network interface for the first WiFi network or a second WiFi network interface for the second WiFi network. Network connection is performed through the second network module. As such, the interference with the second network module can be avoided when the electronic device is in the dual WiFi operating mode.

As an implementation, the obtaining unit 904 is specifically configured to detect the network connection rate of the first WiFi network at a preset frequency.

It is understandable that functions of each program unit of the device for network control of this implementation can be implemented according to the method in the above method implementations, and implementations can be referred to relevant descriptions of the above method implementations, which will not be repeated here.

It is to be noted that, the electronic device described in the device implementation of the disclosure is presented in the form of functional units. The term "unit" used herein should be understood as the broadest meaning as possible, and an object for implementing functions defined by each "unit" may be, for example, an integrated circuit (ASIC), a single circuit, a processor (shared, dedicated, or chipset) and a memory for executing one or more software or firmware programs, a combinational logic circuit, and/or other suitable components that can achieve the above described functions.

Figure 11:
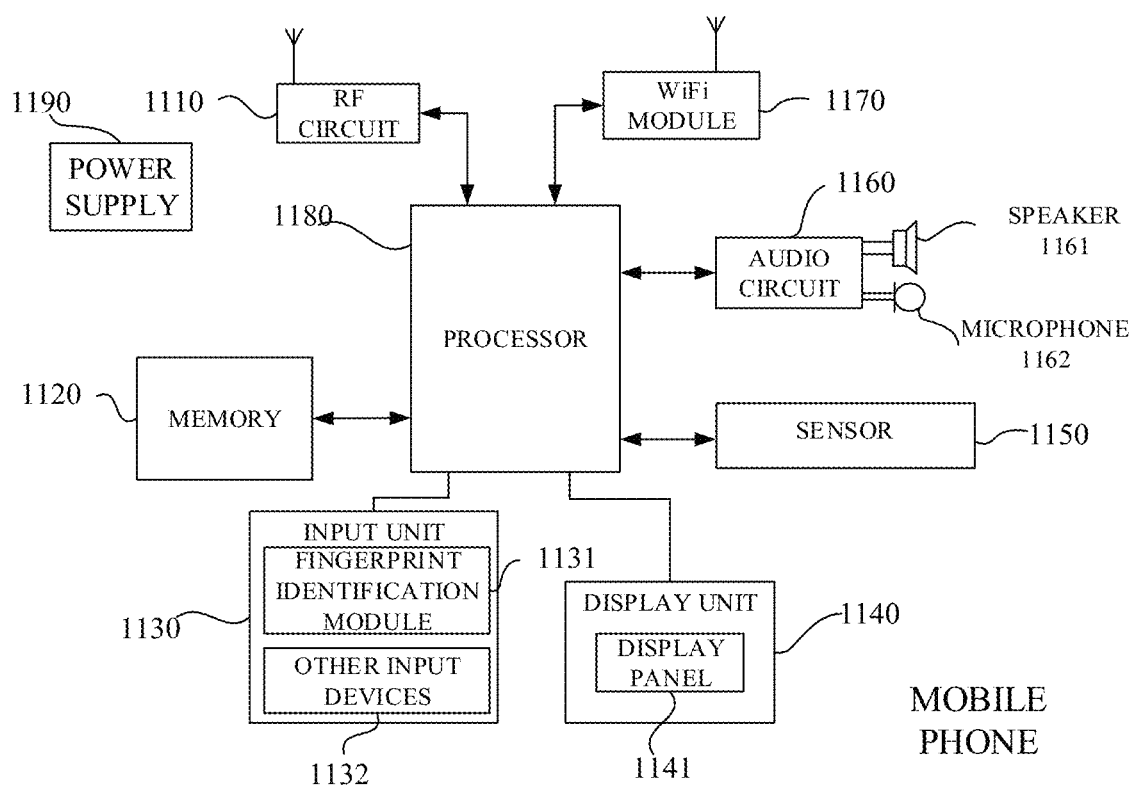
FIG. 11 is another schematic structural diagram of an electronic device provided in other implementations of the present disclosure.

Implementations of the present disclosure also provide another electronic device. For ease of description, only parts related to implementations of the present disclosure are described and for specific technical details that are not described, reference can be made to method implementations of the present disclosure. As illustrated in FIG. 11, the electronic device can include a mobile phone, a tablet computer, a personal digital assistant (PDA), a point of sales (POS), an in-vehicle computer, and other terminal devices. A mobile phone will be taken as an example of the electronic device in the following.

FIG. 11 is a schematic structural diagram of a part of structures of the electronic device that is related to the electronic device provided in implementations. As illustrated in FIG. 5, the mobile phone includes: a radio frequency (RF) circuit 1110, a memory 1120, an input unit 1130, a display unit 1140, a sensor 1150, an audio circuit 1160, a WiFi module 1170, a processor 1180, a power supply 1190, and other elements. It will be appreciated by those skilled in the art that the present disclosure is not limited by the mobile phone as illustrated in FIG. 5. More or fewer elements than that as illustrated in FIG. 11 can be included, some elements may be or combined, or elements can be arranged differently.

Hereinafter, detailed description of each element of the mobile phone will be given below with reference of FIG. 11.

The RF circuit 1110 can be configured to receive and transmit information. Generally, the RF circuit 1110 includes but is not limited to an antenna, at least one amplifier, a transceiver, a coupler, a low noise amplifier (LNA), a duplexer, and the like. Furthermore, the RF circuit 1110 may also be configured to communicate with a network and other devices via wireless communication. The above wireless communication may use any communication standard or protocol, which includes but is not limited to global system of mobile communication (GSM), general packet radio service (GPRS), code division multiple access (CDMA), wideband code division multiple access (WCDMA), long term evolution (LTE), E-mail, short messaging service (SMS), and so on.

The memory 1120 is configured to store software programs and modules. The processor 1180 is configured to execute various function applications and data processing of the mobile phone by running the software programs and the modules stored in the memory 1120. The memory 1120 can mainly include a program storage area and a data storage area. The program storage area can store an operating system, at least one application required by function, and so on. The data storage area can store data created according to use of the mobile phone, and so on. In addition, the memory 1120 can include a high-speed random access memory (RAM), and can further include a non-volatile memory such as at least a disk storage device, a flash device, or other non-volatile solid storage devices.

The input unit 1130 is configured to receive input digital or character information and to generate key signal input associated with user setting and functional control of the mobile phone. Specifically, the input unit 1130 may include a fingerprint identification module 1131 and other input devices 1132. The fingerprint identification module 1131 is configured to collect use's fingerprint data thereon. The input unit 1130 can further include other input devices 1132 in addition to the fingerprint identification module 1131. Specifically, the other input devices 1132 can include, but are not limited to, one or more of a touch screen, a physical keyboard, a functional key (such as a volume control key, a switch key, and so on), a track ball, a mouse, and an operating rod.

The display unit 1140 is configured to display information input by the user, information provided for the user, or various menus of the mobile phone. The display unit 1140 can include a display panel 1141. As an implementation, the display panel 1141 may be configured in the form of a liquid crystal display (LCD), an organic or inorganic light-emitting diode, and so on.

The mobile phone may also include at least one sensor 1150, the sensor includes environmental sensor, and the environmental sensor may include a temperature sensor, a humidity sensor, and an ambient light sensor. In addition to the environmental sensor, the sensor 1150 may also include other sensors 1152, such as a motion sensor, a pressure sensor, and so on. The ambient light sensor can be configured to adjust the brightness of the mobile phone's backlight according to ambient lights, so as to adjust the brightness of the display panel 1141. The proximity sensor can be configured to turn off the display panel 1141 and/or backlight when the mobile phone reaches nearby the ear. As one kind of motion sensor, an accelerometer sensor can be configured to detect the magnitude of acceleration in different directions (typically three axes) and the accelerometer sensor can also be configured to detect the magnitude and direction of gravity when mobile phone is stationary. The accelerometer sensor can also be configured to identify mobile-phone gestures related applications (such as vertical and horizontal screen switch, related games, magnetometer attitude calibration), and can be used for vibration-recognition related functions (such as a pedometer, or percussion), and so on. The mobile phone can also be equipped with other sensors such as a gyroscope, a barometer, a hygrometer, a thermometer, an infrared sensor, etc., which will not be repeated herein.

The audio circuit 1160, the speaker 1161, and the microphone 1162 can provide an audio interface between the user and the mobile phone. On one hand, the audio circuit 1160 can be configured to convert received audio data into electrical signals and transfer the electrical signals to the speaker 1161; the speaker 1161 is configured to convert the electrical signals received into sound signals for output. On the other hand, the microphone 1162 is configured to convert the received sound signals into electrical signals, which will be received and then converted into audio data by the audio circuit 1160. The audio data is then transmitted to the processor 1180 to be processed. The audio data processed by the processor 1180 is transmitted to another mobile phone via an RF circuit 1110 for example or is output to the memory 1120 for further processing.

The wireless network module 1170 may include a first network module and a second network module. The first network module may be connected with a first WiFi network, a second WiFi network, or both. The second network module may include, for example, a Bluetooth network module. The wireless network module enables the mobile phone to realize wireless network connection and perform tasks such as network data transmission.

The processor 1180 is a control center of the mobile phone, and is configured to connect all parts of the whole mobile phone by utilizing various interfaces and lines, to run or execute the software programs and/or the modules stored in the memory 1120, and to call data stored in the memory 1120 to execute various functions and data processing of the mobile phone, so as to monitor the mobile phone as a whole. As an implementation, the processor 1180 can include one or more processing units. As an implementation, the processor 1180 may be integrated with an application processor and a modulation-demodulation processor. The application processor is mainly configured to process an operating system, a user interface, an application program, and the like, and the modulation-demodulation processor is mainly configured to process wireless communication. It can be noted that the modulation-demodulation processor may not be integrated into the processor 1180.

The mobile phone also includes a power supply 1190 (e.g., a battery) that supplies power to various elements. As an implementation, the power supply 1190 may be logically connected with the processor 1180 via a power management system to achieve management of charging, discharging, and power consumption through the power management system.

The mobile phone also includes a camera, and the camera is configured to capture images and videos and transmit the images and videos captured to the processor 1180 for processing.

Although not illustrated, the mobile phone may include a Bluetooth® module, etc., and the present disclosure will not elaborate herein.

The methods of the foregoing implementations as illustrated in FIGS. 2, 4 and 5 can be implemented based on the structure of the mobile phone.

A non-transitory computer storage medium is also provided in implementations of the present disclosure. The computer storage medium is configured to store programs which, when executed, are operable to execute some or all of the operations of any of the network control methods as described in the above-described method implementations. The computer includes an electronic device.

A computer program product is also provided in implementations of the present disclosure. The computer program product includes a non-transitory computer-readable storage medium that stores computer programs. The computer programs are operable with a computer to execute some or all operations of any of the network control methods as described in the above-described method implementations. The computer program product may be a software installation package, and the computer includes electronic device.

It is to be noted that, for the sake of simplicity, the foregoing method implementations are described as a series of action combinations. However, it will be appreciated by those skilled in the art that the present disclosure is not limited by the sequence of actions described. According to the present disclosure, certain steps or operations may be performed in other order or simultaneously. Besides, it will be appreciated by those skilled in the art that the implementations described in the specification are exemplary implementations and the actions and modules involved are not necessarily essential to the present disclosure.

In the foregoing implementations, the description of each implementation has its own emphasis. For the parts not described in detail in an implementation, reference may be made to related descriptions in other implementations.

In the implementations of the present disclosure, it is to be noted that, the apparatus disclosed in implementations provided herein may be implemented in other manners. For example, the apparatus implementations described above are merely illustrative; for instance, the division of the unit is only a logical function division and there can be other manners of division during actual implementations; for example, multiple units or components may be combined or may be integrated into another system, or some features may be ignored, omitted, or not performed. In addition, coupling or direct coupling or communication connection between each illustrated or discussed component may be indirect coupling or communication connection via some interfaces, devices, or units, and may be electrical connection, or other forms of connection.

The units described as separate components may or may not be physically separated, and the components illustrated as units may or may not be physical units, that is, they may be in the same place or may be distributed to multiple network elements. All or part of the units may be selected according to actual needs to achieve the purpose of the technical solutions of the implementations.

In addition, the functional units in various implementations of the present disclosure may be integrated into one processing unit, or each unit may be physically present, or two or more units may be integrated into one unit. The above-mentioned integrated unit can be implemented in the form of hardware or a software function unit.

The integrated unit may be stored in a computer-readable memory when it is implemented in the form of a software functional unit and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions for causing a computer device (which may be a personal computer, a server, or a network device, and so on) to perform all or part of the steps described in the various implementations of the present disclosure. The memory includes various medium capable of storing program codes, such as a USB (universal serial bus) flash disk, a read-only memory (ROM), a RAM, a removable hard disk, a disk, a compact disc (CD), or the like.

It will be noted by those of ordinary skill in the art that all or a part of the various methods of the implementations described above may be accomplished by means of a program to instruct associated hardware, where the program may be stored in a computer-readable memory, which may include a flash memory, a ROM, a RAM, a disk or a CD, and so on.

The implementations of the present disclosure are described in detail above, specific examples are used herein to describe the principle and implementation manners of the present disclosure. The description of the above implementations is merely used to help understand the method and the core idea of the present disclosure. Meanwhile, those skilled in the art may make modifications to the specific implementation manners and the application scope according to the idea of the present disclosure. In summary, the contents of the specification should not be construed as limiting the present disclosure.

What is claimed is:

1. A method for network control, applied to an electronic device, the electronic device comprising a first network module and a second network module, the method comprising:
when the second network module is enabled, determining a target frequency band at which the first network module interferes with the second network module on condition that the first network module is connected with both a first WiFi network and a second WiFi network, wherein the first network module is configured to be connected with the first WiFi network, the second WiFi network, or both, the first network module works at a first frequency band when the first network module is connected with the first WiFi network, and the first network module works at a second frequency band when the first network module is connected with the second WiFi network;
releasing a target WiFi network interface corresponding to the target frequency band, the target WiFi network interface being at least one of following WiFi network interfaces: a first WiFi network interface for the first WiFi network or a second WiFi network interface for the second WiFi network; and
performing network connection through the second network module.

2. The method according to claim 1, wherein determining the target frequency band at which the first network module interferes with the second network module comprises:
when the first frequency band overlaps with an operating frequency band of the second network module, determining that the first WiFi network interface for the first WiFi network in the first network module interferes with the second network module and determining the first frequency band as the target frequency band; and
when the second frequency band overlaps with the operating frequency band of the second network module, determining that the second WiFi network interface for the second WiFi network in the first network module interferes with the second network module and determining the second frequency band as the target frequency band.

3. The method according to claim 2, further comprising:
detecting whether the second frequency band overlaps with the operating frequency band of the second network module on condition that the first frequency band does not overlap the operating frequency band of the second network module.

4. The method according to claim 1, further comprising:
after performing the network connection through the second network module,
performing a data transmission task through the second network module; and
disabling a function of the second network module after the performing of the data transmission task through the second network module is finished, and restoring creation of the target WiFi network interface corresponding to the target frequency band that is released.

5. The method according to claim 1, further comprising:
determining whether the second network module is in an operating state when a simultaneous operation mode of the first WiFi network and the second WiFi network is activated; and
controlling the first network module to simultaneously connect with both the first WiFi network and the second WiFi network when the second network module is not in the operating state.

6. The method according to claim 5, wherein controlling the first network module to simultaneously connect with the first WiFi network and the second WiFi network comprises:
creating the second WiFi network interface corresponding to the second WiFi network to make the first network module operate in the second frequency band through the second WiFi network interface, when the first network module is connected with the first WiFi network; and
creating the first WiFi network interface corresponding to the first WiFi network to make the first network module operate in the first frequency band through the first WiFi network interface and creating the second WiFi network interface corresponding to the second WiFi network to make the first network module operate in the second frequency band through the second WiFi network interface, when the first network module is not connected with both the first WiFi network and the second WiFi network.

7. The method according to claim 5, further comprising:
determining that the simultaneous operation mode is activated, when the first network module is not connected with both the first WiFi network and the second WiFi network and a preset first control operation and a preset second control operation are received; wherein the first control operation is configured to create the first WiFi network interface corresponding to the first WiFi network to make the first network module operate in the first frequency band through the first WiFi network interface; wherein the second control operation is configured to create the second WiFi network interface corresponding to the second WiFi network to make the first network module operate in the second frequency band through the second WiFi network interface; or determining the simultaneous operation mode is activated, when the first network module is connected with the first WiFi network and the preset second control operation is received.

8. The method according to claim 5, further comprising:
obtaining a network connection rate of the first WiFi network when the first network module is connected with the first WiFi network; and
determining the simultaneous operation mode is activated on condition that the network connection rate is lower than a preset network connection rate.

9. The method according to claim 8, wherein obtaining the network connection rate of the first WiFi network comprises:
detecting the network connection rate of the first WiFi network at a preset frequency.

10. An electronic device, comprising a first network module, a second first network module, a processor, a memory, a communication interface, and one or more programs, wherein the one or more programs are stored in the memory and configured to be executed by the processor, and the programs comprise instructions for executing:
determining a target frequency band at which the first network module interferes with the second network module on condition that the first network module is connected with both a first WiFi network and a second WiFi network, when the second network module is enabled; wherein the first network module is configured to be connected with the first WiFi network, the second WiFi network, or the both, the first network module works at a first frequency band when the first network module is connected with the first WiFi network, and the first network module works at a second frequency band when the first network module is connected with the second WiFi network;
releasing a target WiFi network interface corresponding to the target frequency band, the target WiFi network interface being at least one of following WiFi network interfaces: a first WiFi network interface for the first WiFi network or a second WiFi network interface for the second WiFi network; and
performing network connection through the second network module.

11. The electronic device according to claim 10, wherein in terms of determining the target frequency band at which the first network module interferes with the second network module, the programs comprise instructions for executing:
determining that the first WiFi network interface for the first WiFi network in the first network module interferes with the second network module and determining the first frequency band as the target frequency band, when the first frequency band overlaps with an operating frequency band of the second network module; and determining that the second WiFi network interface for the second WiFi network in the first network module interferes with the second network module and determining the second frequency band as the target frequency band, when the second frequency band overlaps with the operating frequency band of the second network module.

12. The electronic device according to claim 11, wherein the programs further comprise instructions for executing:
detecting whether the second frequency band overlaps with the operating frequency band of the second network module on condition that the first frequency band does not overlap the operating frequency band of the second network module.

13. The electronic device according to claim 10, wherein the programs further comprise instructions for executing:
after performing the network connection through the second network module,
performing a data transmission task through the second network module; and
disabling a function of the second network module after the performing of the data transmission task through the second network module is finished, and restoring creation of the target WiFi network interface corresponding to the target frequency band that is released.

14. The electronic device according to claim 10, wherein the programs further comprise instructions for executing:
determining whether the second network module is in an operating state when a simultaneous operation mode of the first WiFi network and the second WiFi network is activated; and
controlling the first network module to simultaneously connect with both the first WiFi network and the second WiFi network when the second network module is not in the operating state.

15. The electronic device according to claim 14, wherein in terms of controlling the first network module to simultaneously connect with the first WiFi network and the second WiFi network, the programs comprise instructions for executing:
creating the second WiFi network interface corresponding to the second WiFi network to make the first network module operate in the second frequency band through the second WiFi network interface, when the first network module is connected with the first WiFi network; and
creating the first WiFi network interface corresponding to the first WiFi network to make the first network module operate in the first frequency band through the first WiFi network interface and creating the second WiFi network interface corresponding to the second WiFi network to make the first network module operate in the second frequency band through the second WiFi network interface, when the first network module is not connected with both the first WiFi network and the second WiFi network.

16. The electronic device according to claim 14, wherein the programs further comprise instructions for executing:
determining that the simultaneous operation mode is activated, when the first network module is not connected with both the first WiFi network and the second WiFi network and a preset first control operation and a preset second control operation are received; wherein the first control operation is configured to create the first WiFi network interface corresponding to the first WiFi network to make the first network module operate in the first frequency band through the first WiFi network interface; wherein the second control operation is configured to create the second WiFi network interface corresponding to the second WiFi network to make the first network module operate in the second frequency band through the second WiFi network interface; or determining the simultaneous operation mode is activated, when the first network module is connected with the first WiFi network and the preset second control operation is received.

17. The electronic device according to claim 14, wherein the programs further comprise instructions for executing:

obtaining a network connection rate of the first WiFi network when the first network module is connected with the first WiFi network; and determining the simultaneous operation mode is activated on condition that the network connection rate is lower than a preset network connection rate.

18. The electronic device according to claim 17, wherein in terms of obtaining the network connection rate of the first WiFi network, the programs comprise instructions for executing:

detecting the network connection rate of the first WiFi network at a preset frequency.

19. A non-transitory computer-readable storage medium for storing a computer program, wherein the computer program causes a computer to execute steps, comprising:

determining a target frequency band at which a first network module interferes with a second network module on condition that the first network module is connected with both a first WiFi network and a second WiFi network, when the second network module is enabled; wherein the first network module is configured to be connected with the first WiFi network, the second WiFi network, or the both, the first network module works at a first frequency band when the first network module is connected with the first WiFi network, and the first network module works at a second frequency band when the first network module is connected with the second WiFi network;

releasing a target WiFi network interface corresponding to the target frequency band, the target WiFi network interface being at least one of following WiFi network interfaces: a first WiFi network interface for the first WiFi network or a second WiFi network interface for the second WiFi network; and performing network connection through the second network module.

20. The non-transitory computer-readable storage medium according to claim 19, wherein in terms of determining the target frequency band at which the first network module interferes with the second network module, the computer program causes the computer to execute:

determining that the first WiFi network interface for the first WiFi network in the first network module interferes with the second network module and determining the first frequency band as the target frequency band, when the first frequency band overlaps with an operating frequency band of the second network module; and determining that the second WiFi network interface for the second WiFi network in the first network module interferes with the second network module and determining the second frequency band as the target frequency band, when the second frequency band overlaps with the operating frequency band of the second network module.

* * * * *